United States Patent [19] [11] 3,743,337
Crary [45] July 3, 1973

[54] CONTACT LENS INSERTER

[76] Inventor: Ely J. Crary, 4730 Austell Road, Marietta, Ga. 30060

[22] Filed: July 26, 1971

[21] Appl. No.: 165,926

[52] U.S. Cl. ............ 294/1 CA, 128/303 R, 351/160
[51] Int. Cl. .................................................. A61f 9/00
[58] Field of Search .................... 294/1 CA, 64 R; 128/303; 351/160

[56] References Cited
UNITED STATES PATENTS
3,304,113 2/1967 Hutchison .................. 294/1 CA
2,384,334 9/1945 Olson .......................... 294/1 CA
3,091,328 5/1963 Leonardos ......................... 206/5

Primary Examiner—Evon C. Blunk
Assistant Examiner—Johnny D. Cherry
Attorney—Harold D. Jones, Jr., George M. Thomas et al.

[57] ABSTRACT

Apparatus for supporting and positioning a contact lens to facilitate applying the lens to the eye. The lens is supported on a receptacle by fluid surface tension. A beam of light passing through the supported lens enables the user to accurately pre-position the lens with respect to the eye. The light provides a visual cue indicating lens contact with the eye, and the eye-lens surface tension causes the lens to remain on the eye.

10 Claims, 2 Drawing Figures

PATENTED JUL 3 1973 3,743,337
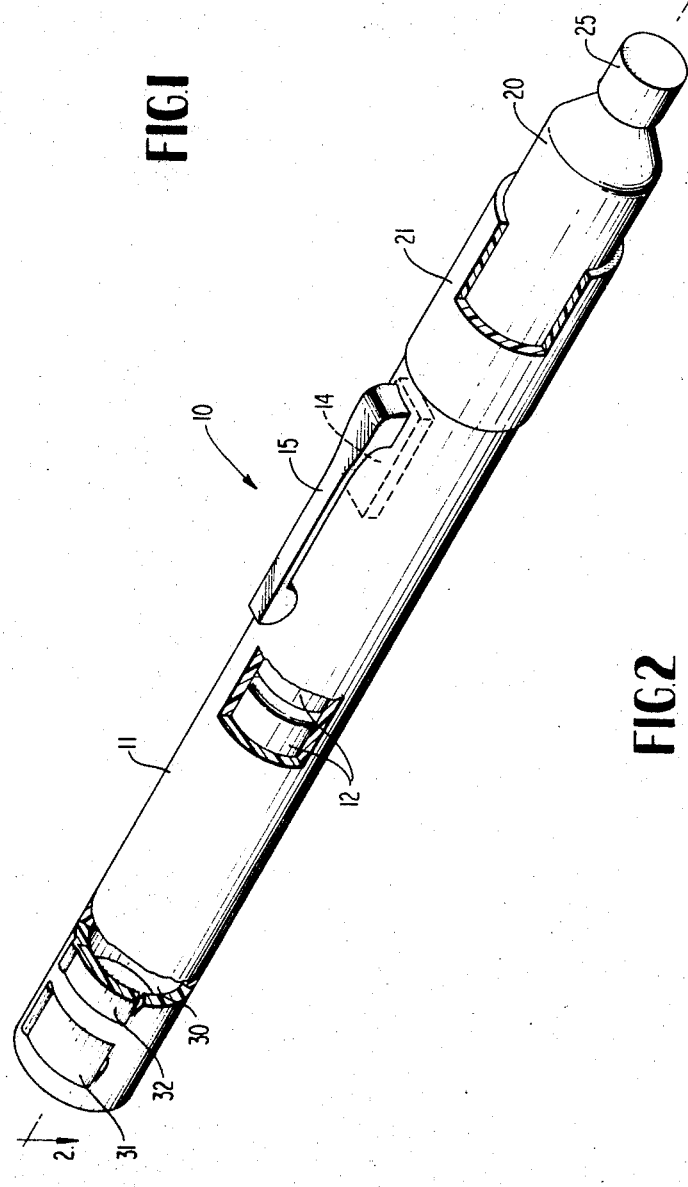
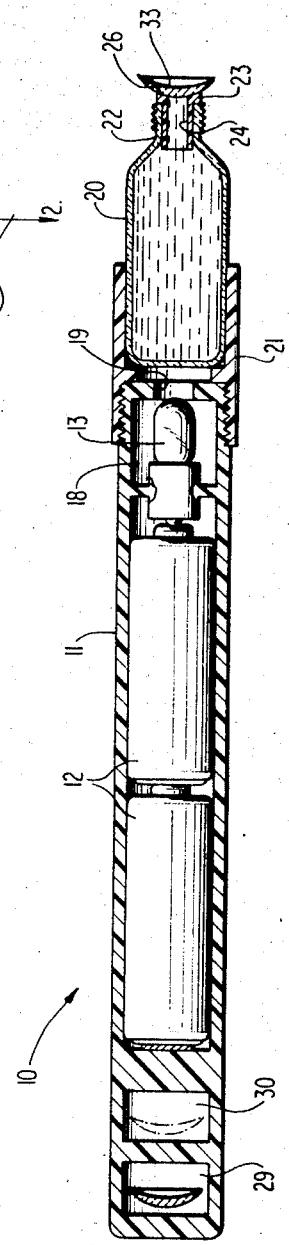
INVENTOR
ELY J. CRARY
BY *Jones & Thomas*
ATTORNEYS

CONTACT LENS INSERTER

This invention relates in general to apparatus for inserting a contact lens and in particular to contact lens inserting apparatus which enables accurate and rapid positioning of the lens to be made with respect to the eye.

Persons in need of vision correction are turning in increasing numbers to the use of contact lenses as an alternative to the conventional frame-type eye glasses because of the convenience, the cosmetic appearance, and frequently the relative safety of contact lenses. Because of the small size of each contact lens, however, the users of such lenses frequently encounter difficulty in applying the lenses to his eyes. Proper insertion of the lens requires that the lens be accurately guided to contact the eye for seating at the proper position on the eye.

Devices which attempt to accomplish the task of applying or inserting contact lenses are known in the prior art. Such devices, however, generally fail to provide a positive and accurate indication to the user that the contact lens have been accurately positioned with respect to the eye. Furthermore, some prior art contact lens applying devices require manipulation of a separate lever or movable element to elevate the contact lens into actual contact with the eye.

Accordingly, it is an object of the present invention to provide improved apparatus for inserting contact lenses.

It is another object of the present invention to provide contact lens inserting apparatus which enables the user to accurately preposition the contact lens for precise contact with the eye.

It is yet another object of the present invention to provide contact lens inserting apparatus which provides the user with a positive indication that the lens has become inserted in the eye.

Other objects of the present invention as well as many of its attendant advantages will become more readily apparent in the following description of a preferred embodiment of the invention as illustrated in the accompanying drawing in which:

FIG. 1 shows a partially broken-away pictorial view of an embodiment of the present invention; and FIG. 2 shows a section view taken along line 2—2 of FIG. 1 including a contact lens positioned for insertion in an eye.

Stated generally, the present invention includes a contact lens holder in fluid communication with a receptacle by the surface tension of the fluid. A source of illumination is directed through the fluid container onto the contact lens to provide an illuminated target which enables the user to position the apparatus and the lens accurately with respect to the eye. When the lens actually contacts the eye, the liquid film between the eye and the lens causes dispersal of the target light spot, thereby notifying the user that lens insertion has occurred. The lens holder is smaller than the diameter of the lens, so that the eye-lens surface tension enables the lens to remain on the eye as the lens holder is withdrawn.

More particularly and with reference taken to the embodiment depicted in the figures, a contact lens inserting apparatus is shown generally at 10 and includes a generally cylindrical housing 11 having a hollow interior dimensioned to receive one or more suitable batteries 12 which may be conventional pen light batteries. The light bulb 13 is positioned within the housing 11 adjacent one end thereof to make electrical contact with one of the batteries 12, with the remainder of the electrical circuit to the light bulb being completed in a conventional manner through a switch 14 which may be positioned and connected to be actuated by suitable movement of the pocket clip 15.

The light bulb 13 is positioned within a chamber 18 having an aperture 19 to direct light for impingement against the bottom of a transparent or translucent bottle 20. The bottle 20 is frictionally removably retained within one end of the sleeve 21, which in turn may be removably attached as by a threaded or a frictional connection to the exterior of the chamber 18. The bottle 20 has a neck 22 of reduced diameter, and a hollow insert 23 is removably positioned within the neck 22. The end of the insert 23 projecting outwardly from the neck of the bottle has a concave curvature to form lens seat 26 which is generally complementary with the typical convex or exterior curvature of contact lenses and which includes an aperture 24 providing liquid communication with the interior of the bottle. A cap 25 is removably attached to the exterior of the bottle neck 22.

A pair of receptacles 29 and 30 are provided at the other end of the housing 11 to receive and store a pair of contact lenses not in use. Suitable closures 31 and 32 such as flaps, slides, or the like, are respectively provided to selectively close the receptacles 29 and 30.

In the operation of the depicted embodiment of the present invention, the user first removes the cap 25 and then places a contact lens 33 on the lens seat 26. The bottle 20 is then squeezed to dispense a small quantity of the liquid contained therein from the aperture 24; this quantity of liquid surrounds the surface of the lens 33 so that the surface tension of the liquid retains the lens in place on the lens seat 26. The user then actuates the switch 14 to turn on the light 13, causing a beam of light to pass through the aperture 19, the transparent or translucent bottom of the bottle 20, and thence through the seat 26 and the lens 33. The user then moves the apparatus toward his eye to observe the light beam emerging from the lens 33. This light beam, which appears as a spot of illumination, is used to guide the lens to the proper position. When the lens has properly contacted the eye, the liquid film which forms between the lens and the eye causes the light from the lens to be dispersed so that the user detects a "flooding" or scattering of light which notifies him that the lens is properly seated against the eye.

The area of the lens seat 26 is selected to be less than the eye-contacting area of the lens 33. The surface tension force arising from the lens-eye contact thus is greater than the surface tension force retaining the lens in place on the seat 26, so that the apparatus 10 may then be withdrawn to permit the lens to become separated from the lens seat and remain in place on the eye.

When both contact lenses have been inserted in the foregoing manner the cap 25 can be replaced on the bottle and the entire apparatus can, if desired, be secured in a shirt or coat pocket by means of the pocket clip 15, so that the lens receptacles 29 and 30 remain conveniently available and also to store the bottle 20 in an upright position, which doubly insures against fluid leakage. The removable insert 23 may be designed to be inserted into conventionally available bottles of contact lens solution and then removed when the empty bottle is discarded.

Although the use of a flexible squeeze bottle 20 has been described herein to eject the liquid from the bottle onto the lens seat, it will be apparent to those skilled in the art that other suitable techniques or devices such as a pump or the like can be provided for causing the necessary liquid flow.

It will, of course, be understood that the foregoing relates only to a preferred embodiment of the present invention and that numerous alterations and changes may be made therein without departing from the spirit and the scope of the present invention.

What is claimed is:

1. Apparatus for retaining and inserting a contact lens comprising:
   housing means;
   liquid receiving means supported by said housing means and having a wall portion permitting illumination to pass therethrough;
   contact lens receiving means disposed in liquid communication with said liquid receiving means and optically aligned with said wall portion, said lens receiving means shaped to conform to an exterior surface shape of a contact lens; and
   a source of illumination positioned within said housing means to selectively direct illumination toward said wall portion and thence toward said lens receiving means.

2. Apparatus as in claim 1, wherein the area of said lens receiving means which comes into proximate contact with a contact lens is less than the area of eye contact of such lens.

3. Apparatus as in claim 2, wherein said liquid communication is provided by an aperture within said area of said lens receiving means, said aperture being in liquid communication with said liquid receiving means.

4. Apparatus as in claim 3, wherein said liquid receiving means is selectively operative to dispense a quantity of a liquid received therein through said aperture and onto said area of said lens receiving means to permit a contact lens to be retained on said area by the surface tension of the dispensed liquid.

5. Apparatus as in claim 4, wherein said source of illumination comprises electric light means disposed within said housing means to direct illumination toward said wall portion of said liquid receiving means; and electric switch means in controlling circuit with said electric light means.

6. Apparatus as in claim 3, wherein:
   said housing means is generally in the shape of a partially hollow cylinder having a first end open to the interior of said cylinder and a second end;
   said liquid receiving means being removably received within said first end and having said wall portion disposed within said first open end to receive illumination from said source of illumination positioned within the interior of said cylinder;
   said lens receiving means being disposed on said liquid receiving means to extend outwardly of said first end of said housing means; and
   said source of illumination comprises electric light means positioned within said cylinder to selectively direct illumination toward said wall portion of said liquid receiving means.

7. Apparatus as in claim 6, further comprising:
   battery receptacle means contained within said partially hollow cylinder and having battery engaging elements; and
   electric switch means in controlling circuit with said electric light means and battery engaging elements of said battery receptacle means.

8. Apparatus as in claim 7, further comprising a pocket clip means secured to the exterior of said cylinder to enable the cylinder to be removably clipped to a sheet of material; and
   said electric switch means being operatively associated with said pocket clip means to enable said electric light means to be actuated by manipulation of the pocket clip means.

9. Apparatus as in claim 6, further comprising at least one lens storage receptacle disposed in said cylinder adjacent said second end thereof; and
   closure means associated with said lens storage receptacle to selectively retain a lens therein.

10. A contact lens inserter comprising contact lens receiving means shaped to conform to the convex surface of the contact lens, electric light means adjacent said contact lens receiving means for directing light through a contact lens positioned on said contact lens receiving means, and a translucent bottle positioned between said contact lens receiving means and said electric light means.

* * * * *